US 6,718,890 B1

(12) United States Patent
Traber et al.

(10) Patent No.: US 6,718,890 B1
(45) Date of Patent: Apr. 13, 2004

(54) UNDERWATER SEAGRASS SEEDING APPARATUS

(75) Inventors: Michael Traber, North Kingston, RI (US); Scott Nixon, Wakefield, RI (US); Stephen Granger, North Kingston, RI (US)

(73) Assignee: The Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 0 days.

(21) Appl. No.: 10/039,250

(22) Filed: Jan. 2, 2002

(51) Int. Cl.$^7$ .................................................. A01C 5/00
(52) U.S. Cl. ........................ 111/149; 111/901; 111/906
(58) Field of Search ................................ 111/200, 900, 111/155, 917, 901, 906, 915, 926, 190, 197, 14, 149; 47/59 R

(56) References Cited

U.S. PATENT DOCUMENTS

| | | | | |
|---|---|---|---|---|
| 3,648,464 A | * | 3/1972 | Edwards ..................... | 405/24 |
| 4,713,896 A | * | 12/1987 | Jennens ....................... | 37/308 |
| 6,070,537 A | * | 6/2000 | Anderson et al. ........... | 111/114 |
| 6,073,563 A | * | 6/2000 | Cox ............................. | 111/100 |
| 6,431,096 B1 | * | 8/2002 | Engelke et al. ............. | 111/127 |

OTHER PUBLICATIONS

Sowing Seeds for Eelgras Restoration, Coastlines web page, Feb. 2001, pp. 1–3.*
Large–Scale, Seed–Based Eelgrass Restoration, Project Bulletin, Project Overview, ciceet.unh.edu web page, Feb. 2000, 3 pages.*
Sowing seeds for eelgrass harvest ciceet.unh.edu web page, Oct. 20, 2000, 2 pages.*
Sowing seeds for Eelgrass Harvest, Kalle Matson, MIT web page, Fall 01, 3 pages.*
"The Influence of Planting Depth and Density on Germination and Development of Zostera Marina L. Seeds"; Traber et al.; Biol. Mar. Medit. (2000), 7 (2): 55–58.
"Density Dependent Effect on Grazing and Success of Seed Generated Seagrass (Zostera MarinaL.) Plants"; Nixon et al.; CICEET Progress Report for Feb. 1, 2000 to Jul. 31, 2000; www.ciceet.unh.edu; Aug., 2000.
"Density–Dependent Effect on Grazing and Success of Seed Generated Seagrass (Zostera Marina L.) Plants"; Nixon et al.; CICET Progress Report for the period of Aug. 1, 1999 through Jan. 31, 2000; www.ciceet.unh.edu; Feb., 2000.
"Propagation of Zostera marina L. from Seed"; Charles Shepard; Seas at the Millennium: An Environmental Evaluation; pp. 4–5; Sep. 2000.

* cited by examiner

Primary Examiner—Victor Batson
(74) Attorney, Agent, or Firm—Gauthier & Connors LLP

(57) ABSTRACT

An underwater seeding apparatus which comprises a first longitudinal member, a second longitudinal member and a cross member. The first longitudinal member is positioned in a parallel relationship to the second longitudinal member and the cross member is attached to the first and second longitudinal members to define a substantially U-shaped frame. At least one thine is attached to the cross-member. The tine opens a furrow in an underwater sediment flow when the apparatus travels along the floor. Means for distributing a seed matrix in the furrow and means for closing the furrow are attached to the apparatus.

12 Claims, 3 Drawing Sheets

UNDERWATER SEAGRASS SEEDING APPARATUS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant No. 5-36852 awarded by NOAA/CICEET.

BACKGROUND OF THE INVENTION

1. Field of the Invention

This invention relates to seagrass restoration and more particularly to an apparatus for seeding coastal sediment.

2. Description of the Related Art

The recent loss of seagrass habitat worldwide, including in estuaries along the East Coast of the United States, has been well-documented in scientific literature. The traditional restoration technique of transplanting whole plants from donor beds to restoration sites has been unable to keep pace with the loss. With target goals of hundreds of thousands of acres of restored seagrass habitat set in estuaries along the East Coast alone, there is a strong incentive to develop additional approaches to seagrass propagation.

The propagation of seagrass from seed is a restoration technique that requires less effort and expense than the traditional restoration technique. However, there still exists a need to find an effective and economical way to plant large numbers of seed in coastal sediments without disrupting the integrity of the seeds and finding a way to protect the seeds from predation when distributing the seeds in the coastal sediment. The present invention solves these needs.

BRIEF SUMMARY OF THE INVENTION

Broadly, the invention comprises an apparatus, and the use thereof, for planting harvested eelgrass seeds in coastal sediment. The apparatus comprises a housing, means for producing furrows in the coastal sediment, means for distributing seeds in the furrow and means for closing the seeded furrows. The means for producing, the means for distributing and the means for closing are affixed to the housing.

Another embodiment of the invention includes an underwater seeding apparatus which comprises a first longitudinal member, a second longitudinal member and a cross member. The first longitudinal member is positioned in parallel relationship to the second longitudinal member and the cross member is attached to the first and second longitudinal member to define a substantially U-shaped frame. At least one tine is attached to the first cross-member. The tine opens a furrow in an underwater sediment floor when the apparatus travels along the floor. The furrow has a depth of within the range of between about 0.5 to 3.0 cm, preferably 2 to 2.5 cm. Means for distributing a seed matrix and means for closing the furrow are attached to the apparatus. The matrix comprises seeds suspended in gelatin. The concentration of seeds in the gelatin is about 2% to 5% by weight or by volume. In an embodiment of the invention, the seeds are *Z.marina*. seeds and the gelatin comprises a ratio of 10:1, (gel g: seawater, 1) at a temperature within the range of between about 0–5° C. In an alternative embodiment, the gelatin comprises a ratio of $10:1^{-1}$ (gel, g: seawater, 1).

In another aspect of the invention, the means for distributing can include at least one conduit wherein the conduit has a discharge end. At least a portion of the discharge end is positioned behind the tine and has a diameter within the range of between about 3 to 9 mm, preferably 6 mm. In yet another aspect of the invention, the discharge ends of the conduits extend downwardly toward the floor. The means for closing the furrow comprises a weighted pad attached to the frame downstream of the tine. In a further embodiment of the invention, the apparatus is characterized in that 1000 seeds are distributed per 0.1 m.

In yet another aspect of the invention, means for dispensing the seed matrix communicates with the means for distributing.

BRIEF DESCRIPTION OF THE DRAWING(S)

DESCRIPTION OF THE PREFERRED EMBODIMENT(S)

Figure 1:
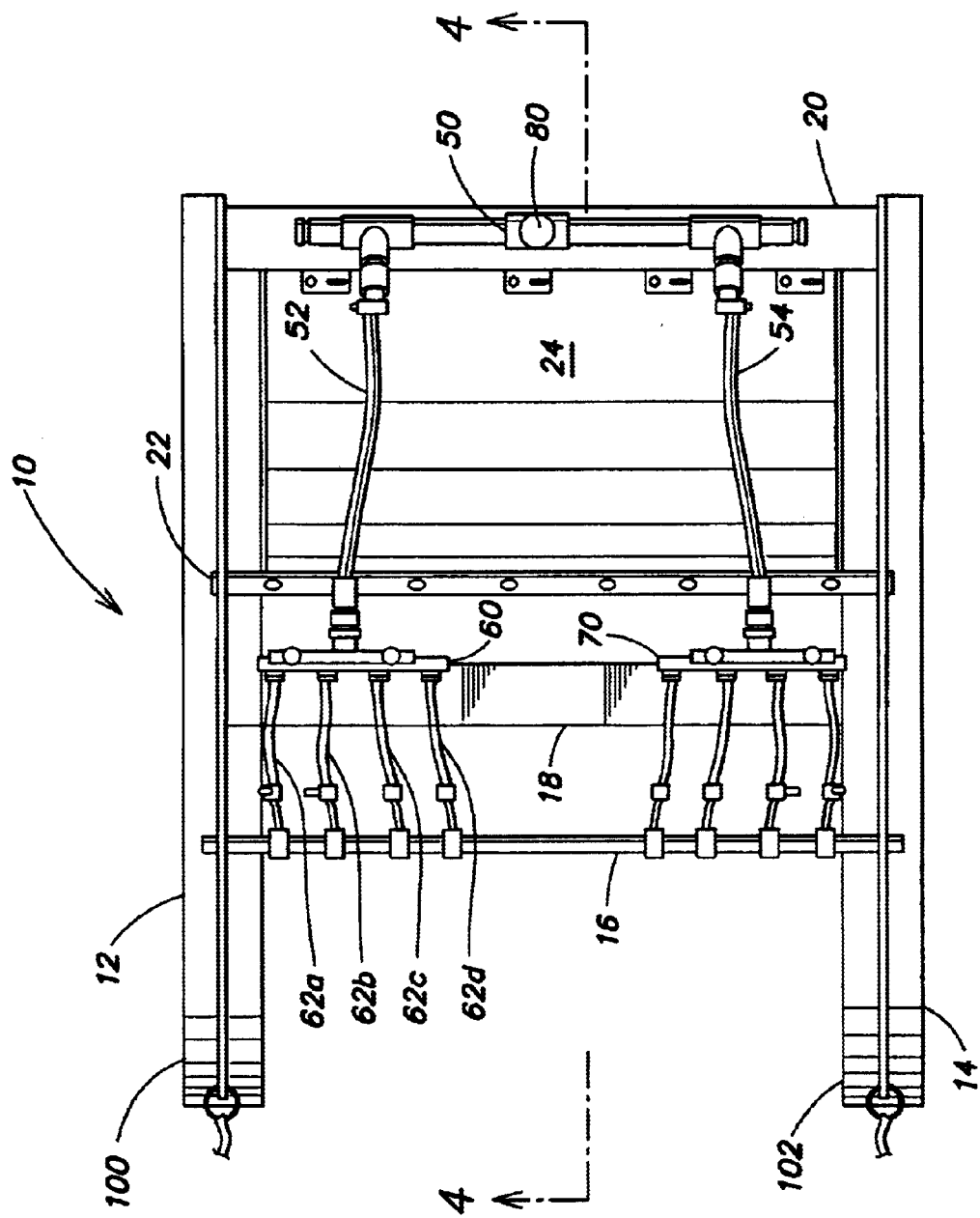
FIG. 1 is a top of view of an embodiment of the invention.

Referring to FIG. 1, an underwater seeding apparatus 10 is shown. The underwater seeding apparatus 10 comprises first and second longitudinal members 12, 14 positioned in parallel relationship. Each longitudinal member 12, 14 has a proximal end 100, 102 respectively, that curves upwardly thereby facilitating the movement of the longitudinal members 12, 14 along the underwater sediment floor as the apparatus 10 is pulled forward. First, second and third cross-members 16, 18, 20 are positioned in perpendicular relationship to the longitudinal members 12, 14. The cross members 16, 18, 20 and longitudinal members 12, 14 can be constructed with wood, aluminum, alloys, polymers, etc. The cross members 16, 18, 20 can be attached to the longitudinal members 12, 14 in any suitable fashion, e.g. by nails, rivets, etcetera. In one embodiment, the first cross member 16 is attached to longitudinal members 12, 14 to define a substantially U-shape.

A fourth cross member 22 is positioned with respect to the longitudinal members in like manner as the first, second and third cross members 16, 18, 20. Depending from the fourth cross member 22 is a support 24.

Figure 2:
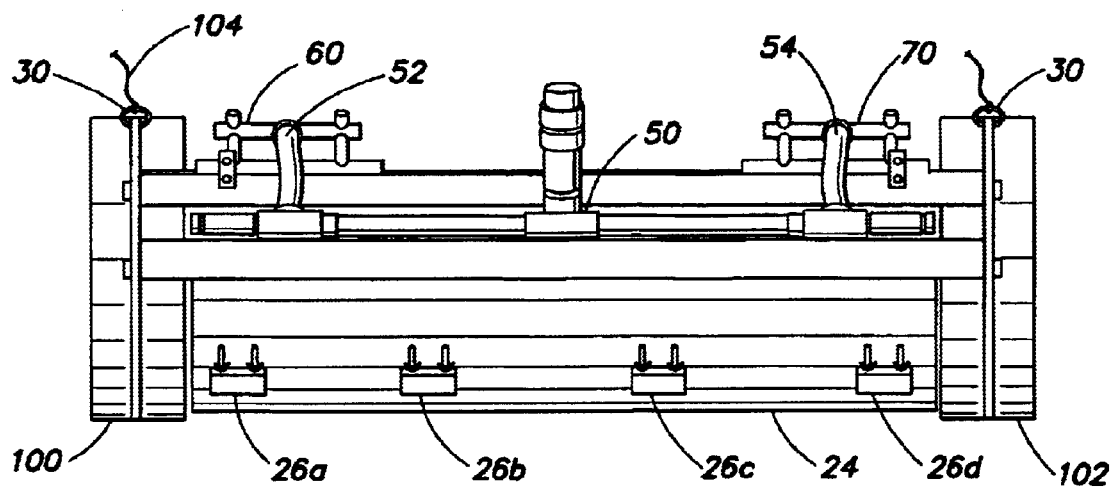
FIG. 2 is a perspective rear view of an embodiment of the invention.
Figure 3:
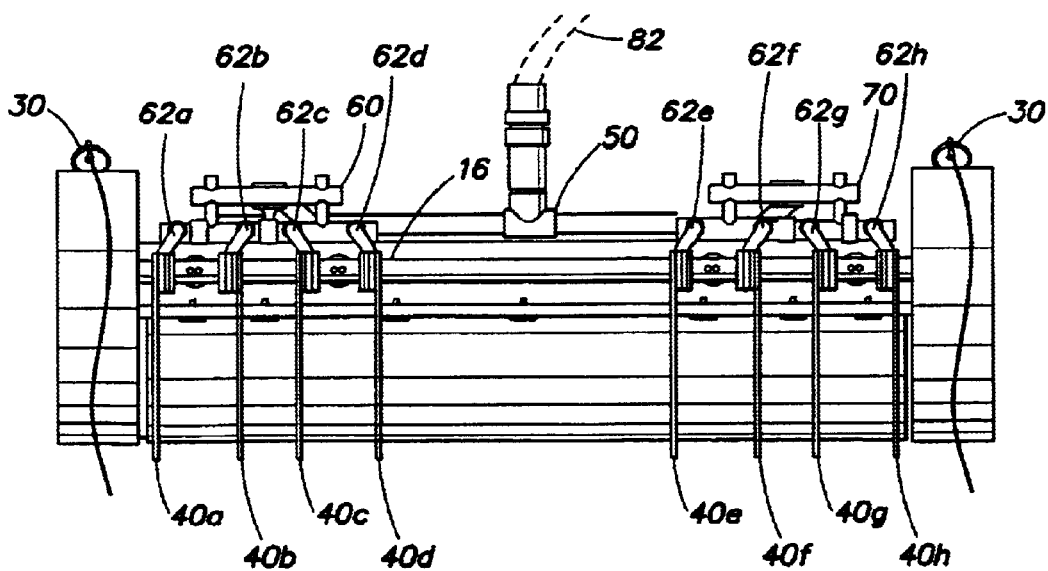
FIG. 3 is a front view of an embodiment of the invention.

Referring to FIGS. 2 and 3, means for pulling the apparatus are attached to each proximal end 100, 102 and can include a metal loop 30 having a tether 104 inserted therethrough. Affixed to the support are weighted pads 26a–d. The support 24 can comprise a substantially planar plastic or metal flexible sheet and the weighted pads 26a–d can comprise lead, stone, concrete, etc. The support 24 is attached to the fourth cross member with nails, rivets, adhesives, etc. and the weighted pads 26a–d can be affixed to the support 24 in any suitable manner, e.g. bolted.

Referring to FIGS. 2 and 3, eight tines 40a–h are attached to the first cross member As the apparatus is pulled, the tines 40 open a furrow in the sea floor. The depth of each furrow opened in the underwater sediment floor by the tines 40 can be within the range of between about 0.5 to 3.0 cm, preferably 2 to 2.5 cm. The tines 40 can be attached to the first cross member 16 in any suitable manner, e.g. bolted.

A manifold 50 and distribution heads 60, 70 are attached to the underwater seeding apparatus 10. The manifold 50 can be attached to the third cross member 20 in any suitable manner, e.g. bolted, and can be constructed of stainless steel. A first conduit 52 is attached to the manifold 50 and communicates with the distribution head 60 and a second conduit 54 is attached to the manifold 50 and communicates with distribution head 70. The first and second conduits 52, 54 are threaded into the manifold 50.

Figure 4:
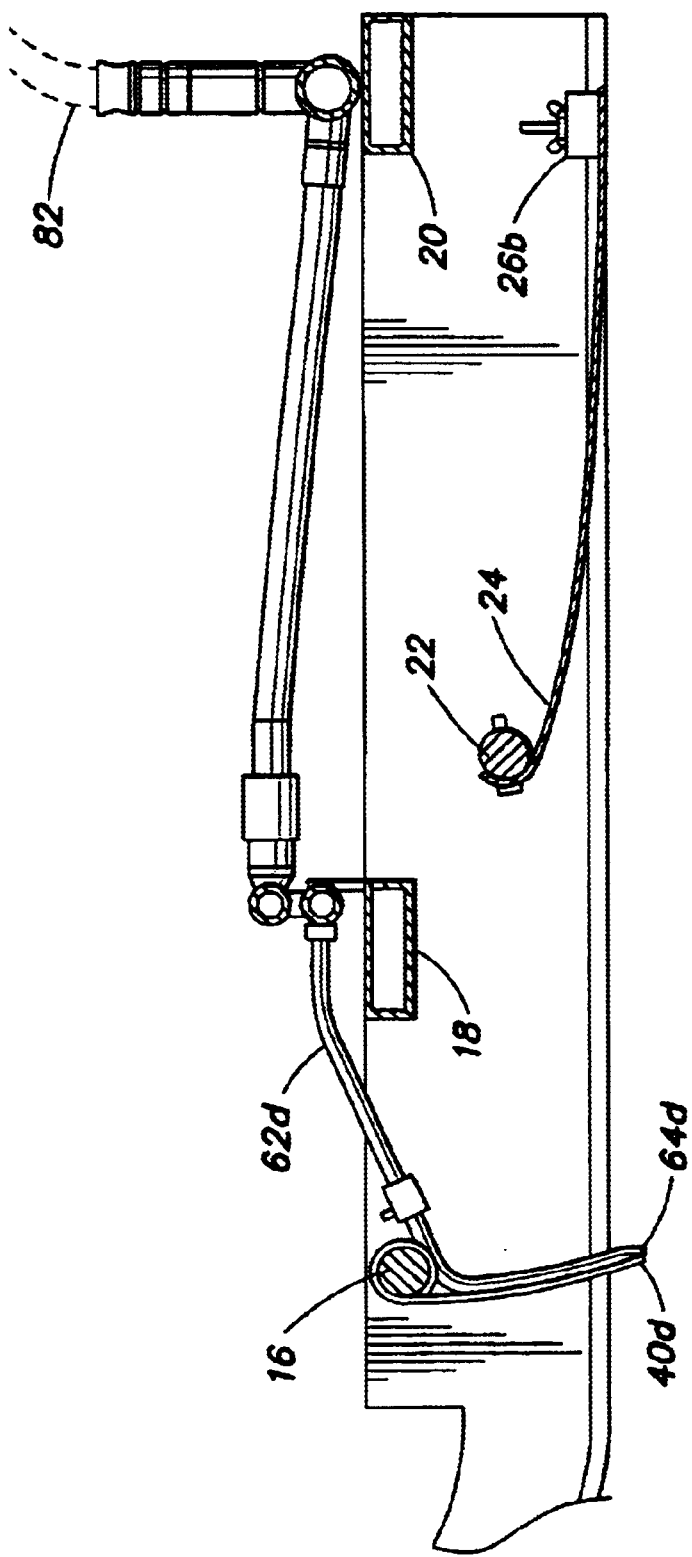
FIG. 4 is a sectional view taken along lines 4—4 of FIG. 1.

The distribution heads 60, 70 are identical and therefore only one will be described. Extending from the distribution head 60 are four tubes 62a–62d that can be constructed of stainless steel. Referring to FIG. 4, each tube has a discharge orifice 64a–d and fluids, gas and semi-solids can pass therethrough. The discharge orifices 64a–d are positioned behind the tines 40a–d respectively. In a preferred embodiment, the lengths of the tines 40 and tubes 62 are coextensive and are welded together. Variations in the number of tines 40, tubes 62, distribution heads 60, 70 are clearly contemplated and are within the scope of this invention. Further, more than one manifold 50 can be attached to the apparatus 10.

Referring to FIG. 1, the manifold 50 has an aperture 80. Referring to FIGS. 3 and 4, a tube 82 (shown in phantom) is received in the aperture 80. The tube 82 extends upwardly from the floor through the water column and communicates with a pump (not shown) that pumps the seed matrix through the tube 82 into the manifold 50 through the first and second conduits 52, 54 through the distribution heads 60, 70 through the tubes 62. The pump, which is commercially available from Edhard Corporation, Hackettstown, N.J., dispenses the matrix at a rate of 1 ml s$^{-1}$ to 20 ml s$^{-1}$ to ensure proper dispensing of seeds through the discharge orifices 64 of the tubes 62. The seed matrix is comprised of gelatin and seeds and has a concentration of seeds in the gelatin of about 2% to 5% by weight or by volume.

The apparatus 10 is towed along the bottom opening a furrow as it moves over the sediments. Seagrass seeds, held in suspension by the gelatin, are pumped from a reservoir in a surface support boat through the tube 82. The apparatus can be pulled manually as well. The discharge orifices 64 of the tubes 62 distribute the seeds, e.g. a geyseed mixture. The tubes 62 are mounted behind the tines 40 allowing the seed matrix to be deposited into the furrow. The weighted pads 26 attached to the back of the apparatus 10 close the furrow. The pump settings are designed to achieve seed/gel delivery rates of 750 to 2,000 seeds m$^{-2}$. The pump is capable of metering exact amounts of viscous materials without damaging the contents. The pump allows for the precise control of gel application without damaging the seeds as they pass through the pump head. The design of the seeding technique relies on the seed matrix comprised of a gelatin that holds the seeds in suspension. Knox gelatin, (Kind and Knox Gelatin Inc. PO Box 927 Sioux City, Iowa 5:L:L02) prepared with seawater, was used to prepare the seeding matrix. The following experiments used a ratio of gelatin to seawater of 10:1 (gel, g: seawater, 1) at a temperature between 0–5° C. The pump used was an Edhart Power Base PT-4035 with a FTR-5030 Lobe Filler Unit (pump head). The pump was modified by connecting the outlet port of the Lobe Filler to the manifold (mounted on the apparatus) via a 2 cm ID (approx) flexible plastic tube.

Experiment 1

Two flow-through seawater tanks each measuring 5.8 mx:1.8 mx::1 m were used as the test tanks. One tank was lined with fine, higher organic (1.7%) sediment indicative of Narragansett Bay while the second was lined with coarse, low organic (0.5%) sediment indicative of Rhode Island Sound. Two seeding runs of approximately 1.5 meters in length took place in each tank. A total of 1000 seeds were to be planted for each run to yield a planting density of 1000 seeds m$^{-2}$. Viable ungerminated seeds were selected and added to 500 ml of prepared gel matrix. The seed-gel matrix was pumped through tubing and followed by 1500 ml of unseeded gel to purge the lines. During tank trials the seeding sled was pulled through the tank using a hand winch secured to the tank wall. Speed and distance traveled were estimated using markers placed every 25 cm along the run. The test run was terminated when the majority of seeds had been cleared from the lines. At the end of each run all lines were flushed and any seeds remaining were tallied. Concurrently with each tank trial, three replicate control plots measuring 0.024 m$^2$ were seeded at a density 1000 seeds m$^{-2}$ (24 seeds each). Seeds in each control plots were planted by hand at a depth of 2.5 cm using calibrated tweezers.

Experiment 2

Four sites were selected to include a range of environmental conditions. These sites ranged from more energetic sites in Narragansett Bay to low energy sites in Ninigret Pond (Charlestown, R.I.). All sites selected were either in or adjacent to an existing eelgrass bed or previous eelgrass restoration site. Planting at a site where eelgrass already exists, would eliminate the question of whether water quality could sustain eelgrass growth and would allow for a better determination of the success or failure of the mechanized seeding technique. At each of the four sites a test plot was located using PVC stakes. At shallower sites the sled was towed manually while at deeper sites the sled was towed from the tending vessel. In this way we would have better control of the delivery rate and the speed at which the sled moved along the bottom. Divers visually monitored the seeding process. Hand signals were used to communicate and control the speed of the sled and the termination of each run. After each run seeds remaining in the line or pump were collected, tallied and the number of seeds successfully planted calculated. Between one to three test runs, depending on site specific conditions, were performed at each location. The gel matrix used was prepared the day before each planting with a ratio of 10:1 (grams of gel: litres of seawater) and held on ice until the time of planting. Seeds were mixed with the gel matrix just prior to planting. The seeds were planted to a depth of one to three centimeters into the sediments and were planted to achieve a density of 1000 seeds m$^{-2}$. Concurrently three replicate control plots (0.024 m$^2$) were located at each of the four field sites and seeded at a density of 1000 seeds meter$^{-2}$ by hand.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. An underwater seeding apparatus which comprises:
   a first longitudinal member:
   a second longitudinal member;
   a cross member; the first longitudinal member being positioned in a parallel relationship to the second longitudinal member, the cross member being attached to the first and second longitudinal member to define a substantially U-shaped frame;

at least one tine attached to the first cross-member; the tine opening a furrow in an underwater sediment floor when the apparatus travels along the floor;

means for distributing a seed matrix comprised of seeds in the furrow;

means for closing the furrow.

2. The apparatus of claim 1 wherein the means for distributing comprises at least one conduit, the conduit having a discharge end, at least a portion of the discharge end being positioned behind the tine, the seeds being distributed at a rate of 1000 seeds per 0.1 m.

3. The apparatus of claim 2 wherein the discharge ends of the conduits extend downwardly towards the floor.

4. The apparatus of claim 3 wherein the means for closing comprises a weighted pad attached to the frame downstream of the tine.

5. The apparatus of claim 1 wherein the furrow has a depth of within the range of between about 0.5 to 3.0 cm.

6. The apparatus of claim 5 wherein the matrix comprises seeds suspended in gelatin, the matrix having a gelatin to seawater ratio of 10:1.

7. The apparatus of claim 6 wherein the cross member is a first cross member and which further comprises:

a second cross member; and a third cross member, the second cross member being positioned in a parallel relationship to the first and third cross members, the second and third cross members being attached to the first and second longitudinal members.

8. The apparatus of claim 7 wherein the means for closing comprises at least one weighted pad attached to the third cross member.

9. The apparatus of claim 8 which further comprises at least eight tines and wherein the means for distributing comprises a manifold and a first and second distribution head, the manifold having a first and second conduit, the first conduit communicating with the first distribution head and the second conduit communicating with the second distribution head,. each distribution head having four tubes, each tube having a discharge orifice positioned behind at least one tine.

10. The apparatus of claim 9 wherein the manifold comprises an aperture, the aperture being adapted to receive a tube, the tube being attached to means for dispensing the matrix.

11. The apparatus of claim 10 wherein the means for dispensing comprises a pump.

12. An underwater seeding apparatus which comprises:

a housing;

means for producing furrows in coastal sediment affixed to the housing;

means for distributing seeds in the furrow at a predetermined rate affixed to the housing and means for closing the seeded furrows affixed to the housing.

* * * * *